United States Patent [19]
Smith et al.

[11] Patent Number: 5,995,477
[45] Date of Patent: Nov. 30, 1999

[54] DATA CARTRIDGE CADDY-TO-STORAGE RACK REFERENCING METHOD AND APPARATUS

[75] Inventors: Mark A. Smith, Holdrege, Nebr.; Daniel R. Dauner; Gregg S. Schmidtke, both of Fort Collins, Colo.

[73] Assignee: Hewlett-Packard Company, Palo Alto, Calif.

[21] Appl. No.: 08/853,617

[22] Filed: May 9, 1997

[51] Int. Cl.$^6$ .............................. G11B 17/04; G11B 17/08
[52] U.S. Cl. ........................................ 369/178; 360/98.06
[58] Field of Search ................................ 369/178, 35, 36; 360/92, 98.01, 98.04, 98.06, 132; 206/387.15

[56] References Cited

U.S. PATENT DOCUMENTS

| | | | |
|---|---|---|---|
| 3,812,537 | 5/1974 | Grae et al. | 360/132 |
| 5,247,406 | 9/1993 | Apple et al. | 360/92 |
| 5,274,516 | 12/1993 | Kakuta et al. | 360/92 |
| 5,576,911 | 11/1996 | Porter | 360/98.06 |
| 5,644,445 | 7/1997 | Ishikawa | 360/92 |
| 5,659,440 | 8/1997 | Acosta et al. | 360/92 |

*Primary Examiner*—David L. Ometz
*Assistant Examiner*—Angel Castro
*Attorney, Agent, or Firm*—Cynthia S. Deal

[57] ABSTRACT

A sleeve for providing referencing between an autochanger storage rack and a data cartridge caddy before, during and after installation of the data cartridge caddy into the autochanger storage rack. The sleeve provides accurate alignment and referencing in the X, Y and Z directions so that it is relatively easy for a user to install the data cartridge caddy into the autochanger storage rack. The sleeve also maintains the data cartridge caddy in a predetermined referenced position so that the data cartridge handling system of the autochanger is able to assume that the data cartridge caddy and all of the data cartridges in the data cartridge caddy are in predetermined locations.

4 Claims, 13 Drawing Sheets

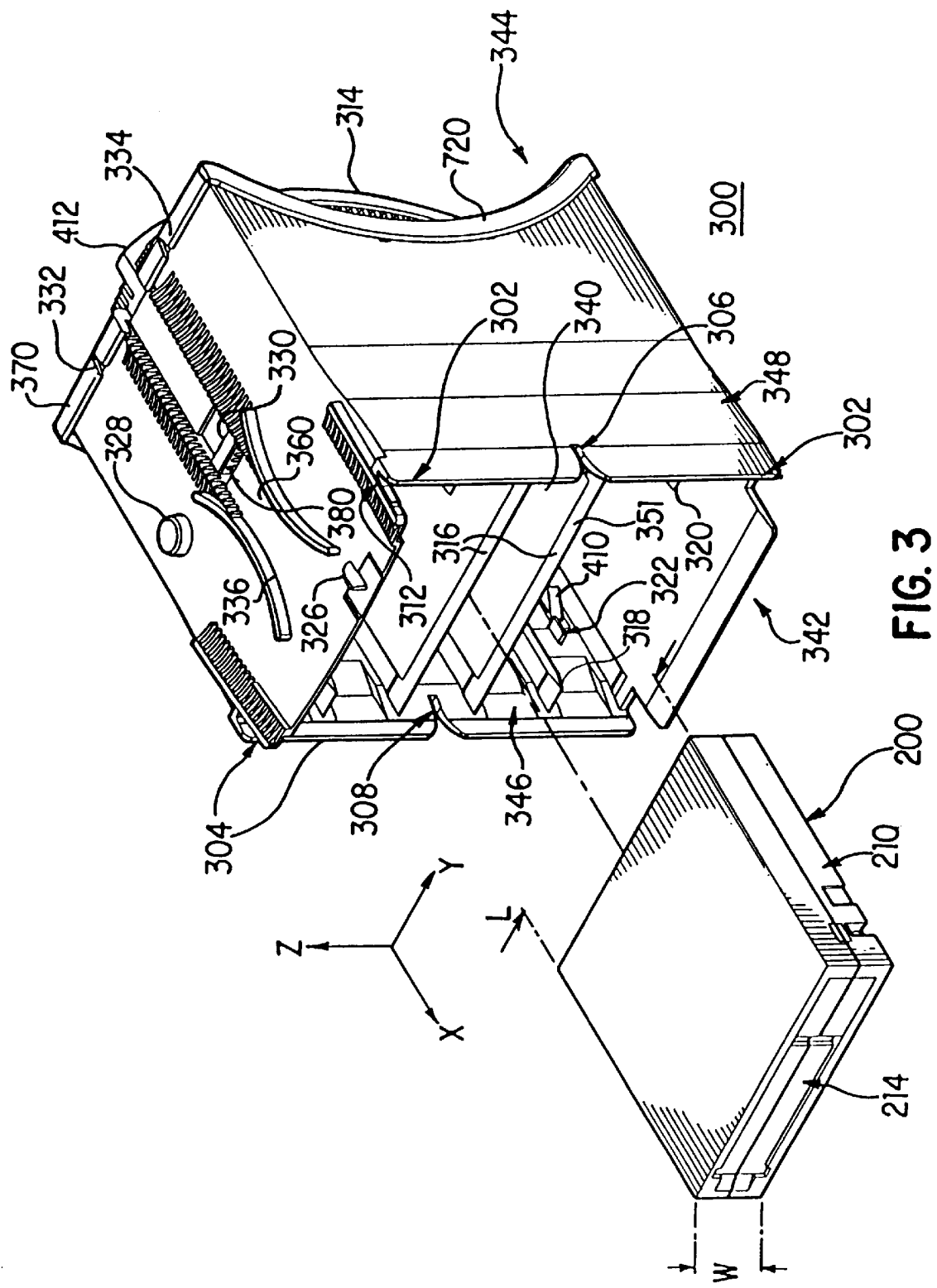

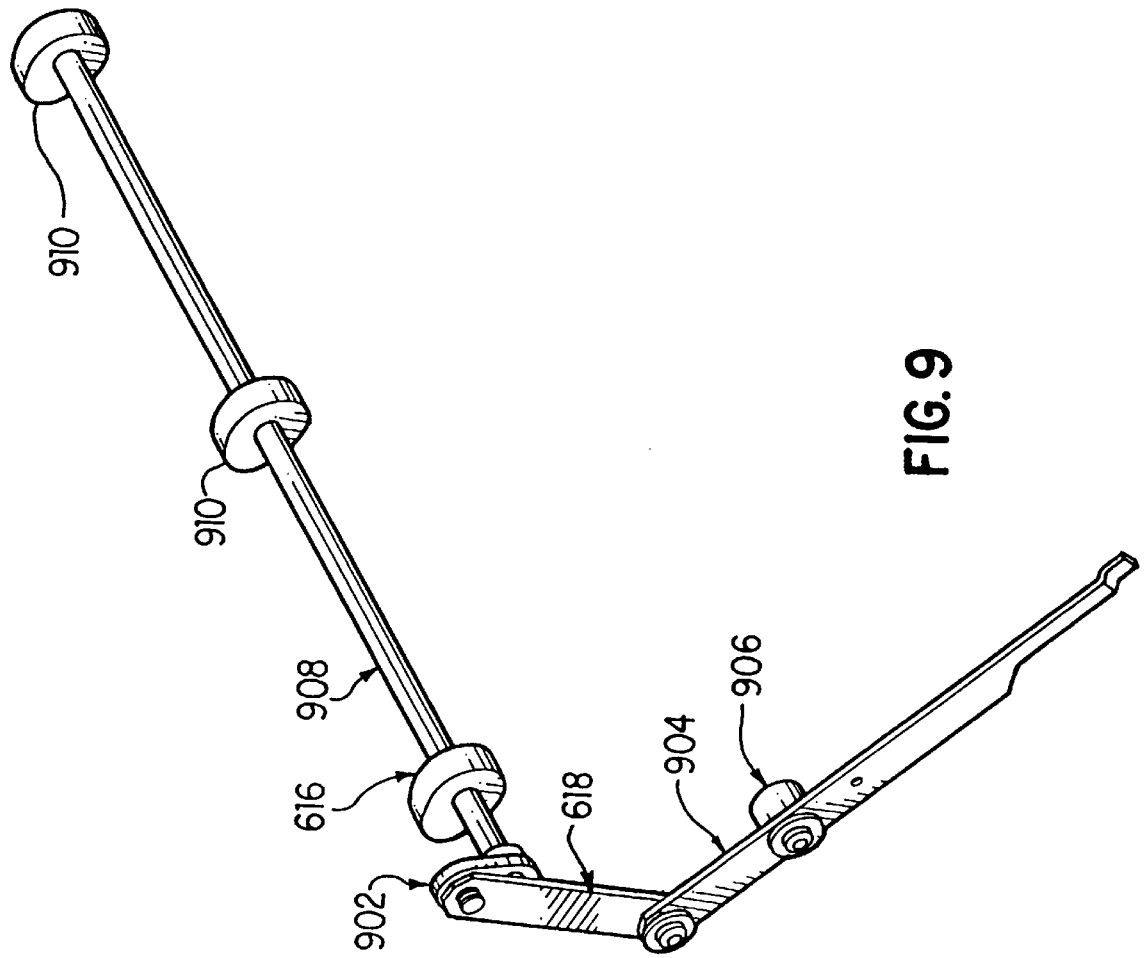

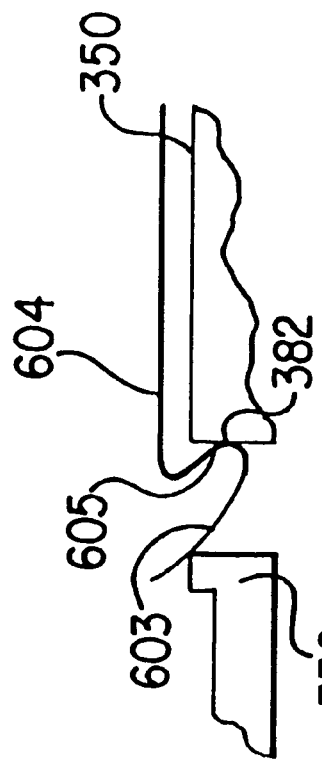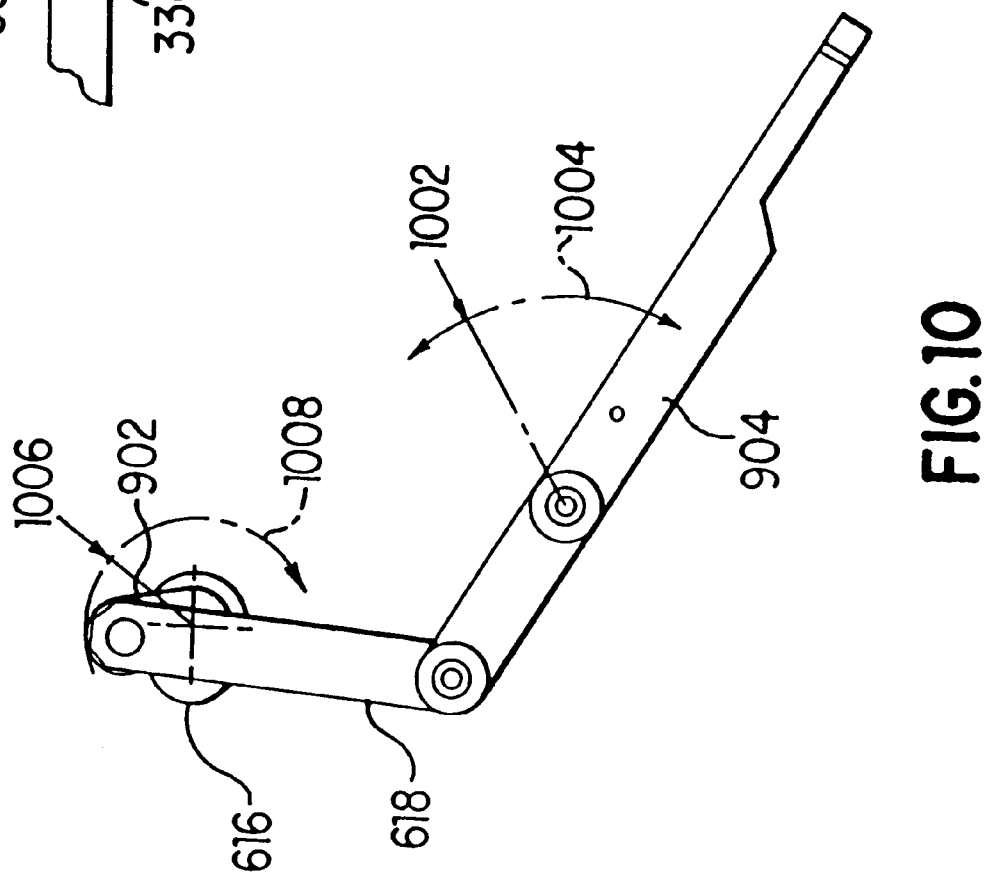

DATA CARTRIDGE CADDY-TO-STORAGE RACK REFERENCING METHOD AND APPARATUS

This application is related to the following copending U.S. patent applications: BEZEL WITH HANDLE FOR MEDIA CARTRIDGE CADDY, U.S. Ser. No. 29/066,714, filed Feb. 28, 1997; BEZEL FOR RACK MOUNTED DEVICES, U.S. Ser. No. 29/066,713, filed Feb. 28, 1997; DATA CARTRIDGE HANDLING AND STORAGE CADDY, U.S. Ser. No. 08/853,540, filed May 9, 1997; DATA CARTRIDGE INTERLOCK AND RELEASE SYSTEM, U.S. Ser. No. 08/853,817, filed May 9, 1997; DATA CARTRIDGE INTERLOCK RELEASE ACTUATOR SYSTEM, U.S. Ser. No. 08/853,619, filed May 9, 1997; DATA CARTRIDGE CADDY-TO-STORAGE RACK INTERLOCK AND RELEASE SYSTEM, U.S. Ser. No. 08/853,625, filed May 9, 1997; DATA CARTRIDGE-TO-CADDY REFERENCING SYSTEM FOR A DATA CARTRIDGE HANDLING MECHANISM WITHIN AN AUTOCHANGER, U.S. Ser. No. 08/853,608, filed May 9, 1997; and DATA CARTRIDGE CADDY PRESENCE SENSING METHOD AND APPARATUS, U.S. Ser. No. 08/853,542, filed May 9, 1997.

FIELD OF THE INVENTION

The present invention relates generally to the field of data cartridge storage and handling systems, and more particularly to a portable carrying case or caddy for handling data cartridges. In particular, this invention provides a referencing method and apparatus to enable a user to install a data cartridge caddy into an autochanger library storage rack easily.

BACKGROUND OF THE INVENTION

A computer information storage library (also known as an autochanger) typically includes at least one computer information drive mechanism, a media storage system for computer information media or data cartridges, a picker (also called a gripper or manipulator or engagement mechanism) for inserting media or cartridges into drives or storage locations and for extracting media or cartridges from drives or storage locations, and a transport mechanism for moving the picker and media or cartridges between drives and storage. Computer information storage drives with removable media include, for example, disk drives (magnetic and optical) and magnetic tape drives.

Media storage systems include, for example, carousels, cylindrical silos, and slotted magazines or racks. There is a wide spectrum of transport assemblies. For example, cartridges may be translated and rotated with four or more degrees of freedom by an anthropomorphic robot arm or cartridges may simply be translated in two dimensions. Alternatively, instead of a separate transport mechanism, the media storage system may be moveable. For example, a carousel may rotate to position a cartridge at a stationary drive.

Alternatively, a drive may be moved by a transport system to a stationary cartridge location. There is also a wide spectrum of pickers. For example, friction grippers with multiple fingers may be used, various media or cartridge features may be hooked or clamped, or cartridges may be simply pushed or pulled. In particular, the DLT tape cartridge, commercially available from Quantum Corporation, Milpitas, Calif., is of interest for computer information storage libraries.

A computer information storage library or autochanger generally has a storage rack for holding a plurality of media cartridges that are not currently being retrieved or otherwise utilized by the autochanger in a storage location. Generally, a robotic arm or picker will retrieve a media cartridge from its location in the storage rack and place it in a drive when the particular media cartridge is needed. The media cartridge will generally be returned to the same or a different location on the storage rack when it is no longer being used. Media cartridges are held in both fixed (i.e., nonremovable) and removable storage slots or caddies on the storage rack. Removable caddies may hold about five cartridges, although five is not a magical number and a caddy may accommodate a different number of data cartridges. The storage caddies can be removed from the storage rack and changed out for a different storage caddy of media cartridges.

SUMMARY OF THE INVENTION

In a preferred embodiment, the present invention provides a data cartridge handling and storage caddy for transporting data cartridges when they are being handled outside of the autochanger storage rack. In a preferred embodiment, the present invention also provides a method and apparatus for referencing the handling and storage caddy to the cartridge storage locations in order to insert the handling and storage caddy into the cartridge storage locations.

Other aspects and advantages of the present invention will become apparent from the following detailed description, taken in conjunction with the accompanying drawings, illustrating by way of example the principles of the invention.

BRIEF DESCRIPTION OF THE DRAWINGS

The above and other objects, features and advantages of the present invention will be better understood by reading the following more particular description of the invention, presented in conjunction with the following drawings, wherein:

FIG. 3 shows a perspective view of a DLT data cartridge handling and storage caddy from the cartridge magazine side of the caddy according to the present invention;

FIG. 9 shows a perspective view of a data cartridge interlock release actuator system according to the present invention;

FIG. 10 shows a side perspective view of the data cartridge interlock release actuator system shown in FIG. 9 according to the present invention; and FIG. 11 shows an exploded, side perspective view of the data cartridge caddy-to-storage rack interlock and release according to the present invention.

DETAILED DESCRIPTION OF THE PREFERRED EMBODIMENT

Figure 1:
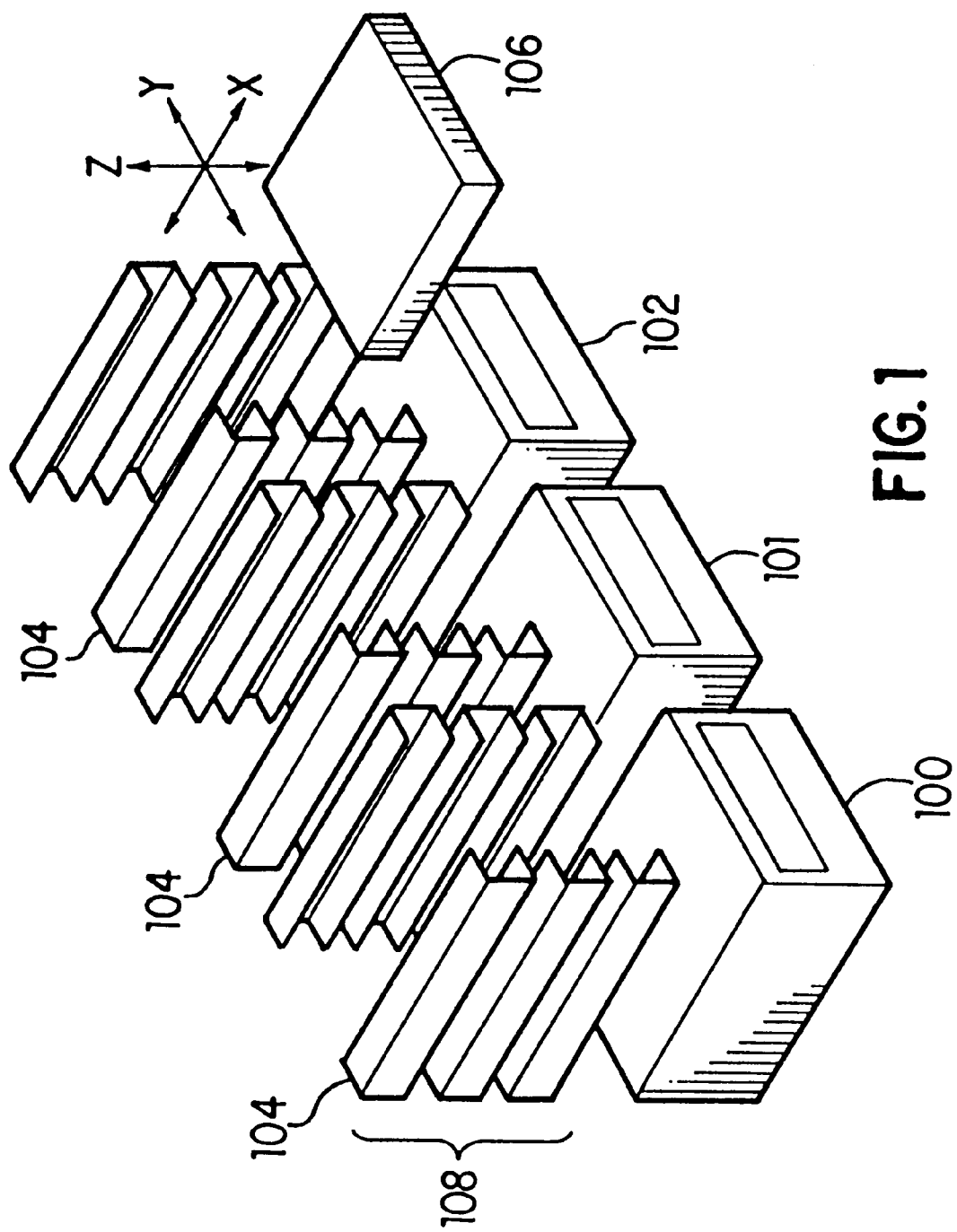
FIG. 1 shows a simplified perspective view of portions of a computer information storage library.

FIG. 1 is a simplified perspective view of a computer information storage library (also known as an autochanger) in accordance with an example embodiment of the present invention. The autochanger illustrated in FIG. 1 has three computer information drive mechanisms 100, 101, and 102, mounted in the base of a cabinet (not illustrated). At least one column of cartridge storage locations 104 above the drives is used to store data cartridges. A compact example embodiment of a storage rack using the concepts of the present invention may have only one or two columns of storage locations and a larger embodiment may have more than three columns. The storage locations 104 may be defined, for example, by "C" shaped brackets as illustrated in FIG. 1, "L" shaped brackets, shelves, edge guides, or other suitable holders.

Preferably, the storage locations 104 include features to prevent cartridges from vibrating or shaking out of the storage locations. A transport mechanism (not illustrated) provides horizontal (X and Y) and vertical (Z) displacement of a picker 106 and supports the picker 106 at a fixed orientation relative to the displacement path. The picker 106 includes a sleeve with guides for carrying a data cartridge and a moveable thumb (not illustrated). Examples of suitable transport mechanisms for a computer information storage rack configured as generally depicted in FIG. 1 may be found in U.S. Pat. Nos. 5,101,387, 5,043,962 and U.S. patent application Ser. No. 08/296,054, each of which is hereby incorporated by reference for all that they teach.

The various features of the present invention will be described in greater detail below with reference to FIGS. 1–10 and sections I.–V.

I. DATA CARTRIDGE HANDLING AND STORAGE CADDY

Figure 2A:
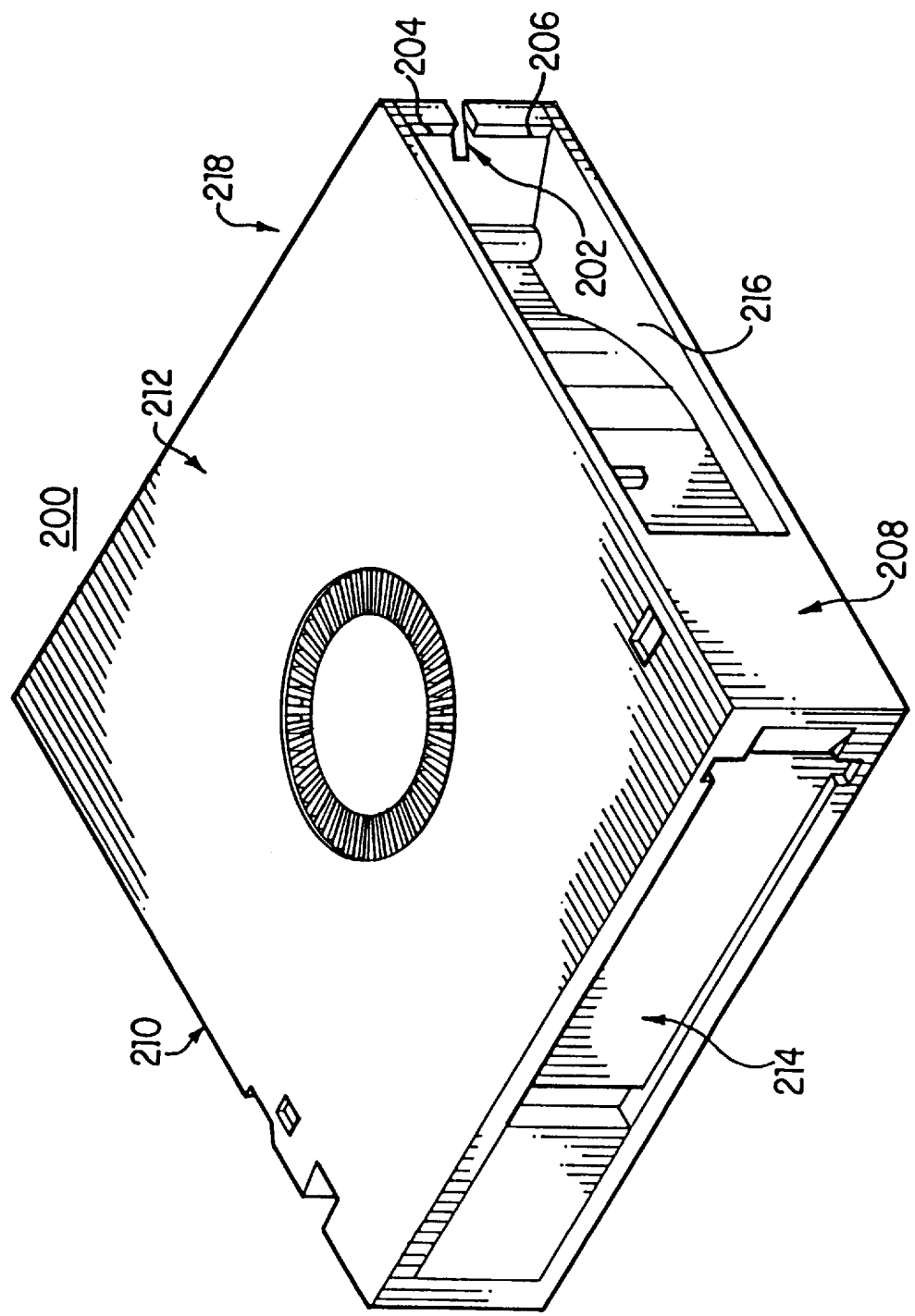
FIG. 2A shows a perspective view of a typical DLT data cartridge.
Figure 2B:
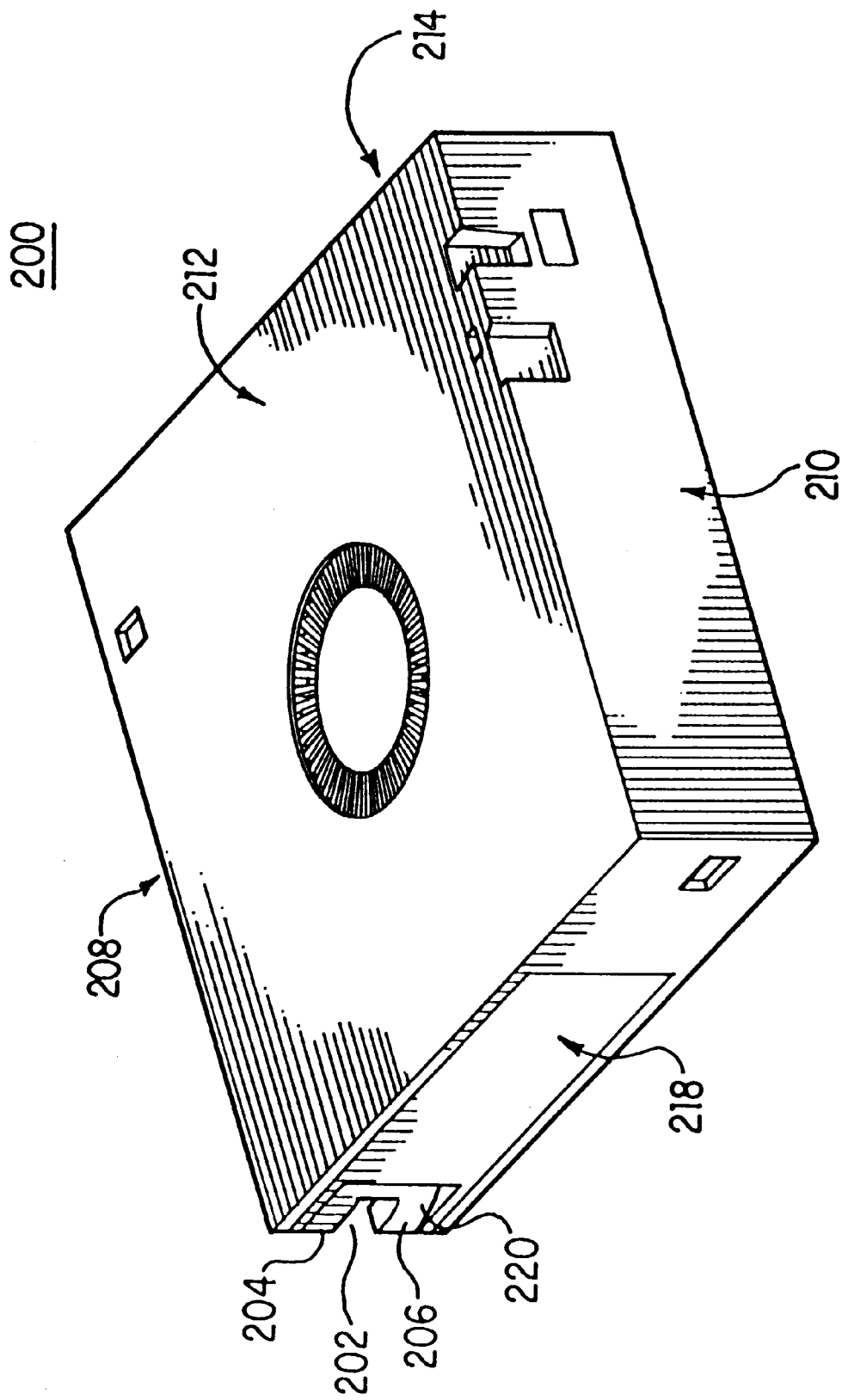
FIG. 2B shows a second perspective view of a typical DLT data cartridge.
Figure 2C:
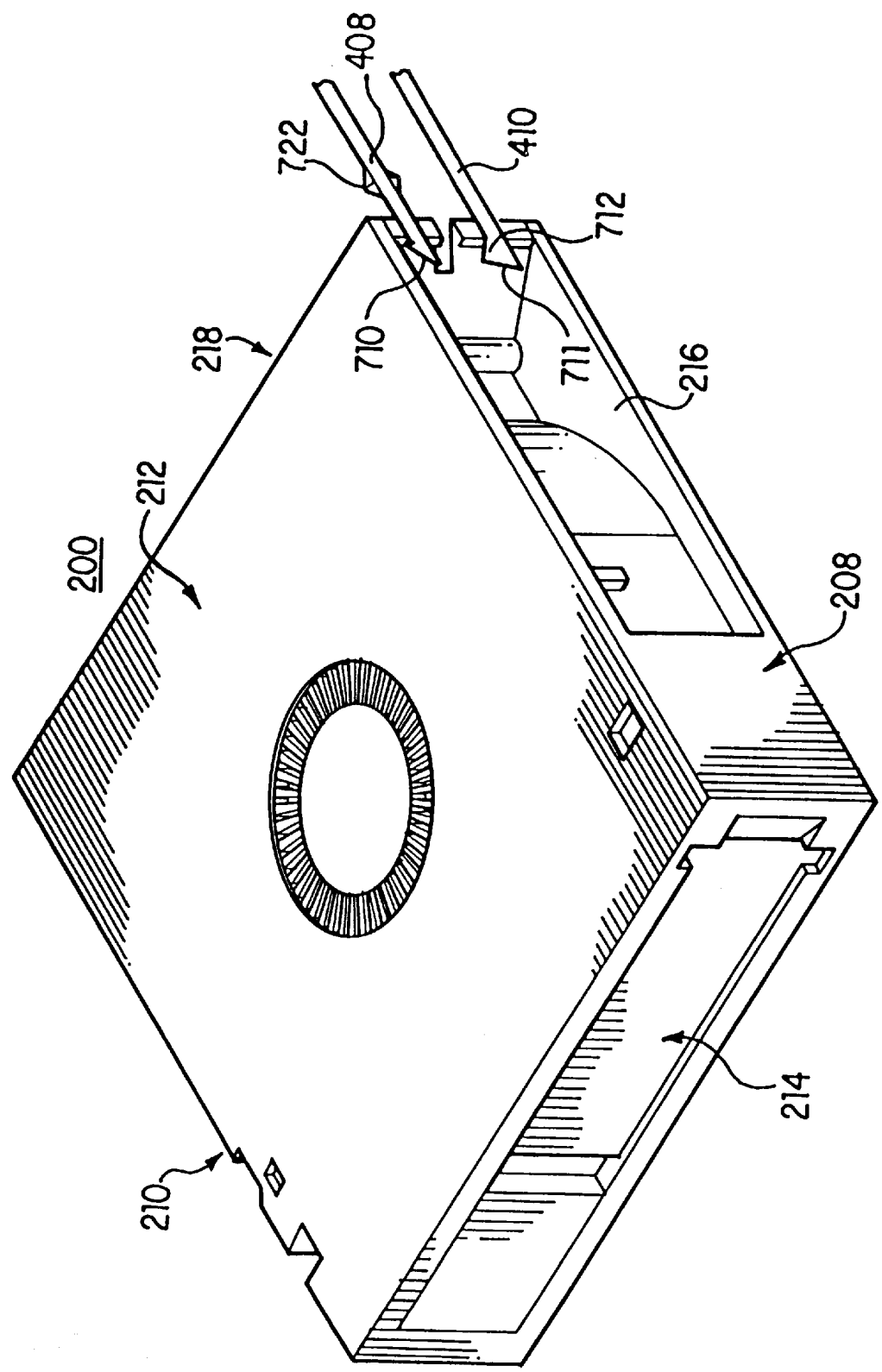
FIG. 2C shows the second perspective view of a typical DLT data cartridge of FIG. 2C with lock and detent springs according to the present invention.
Figure 2D:
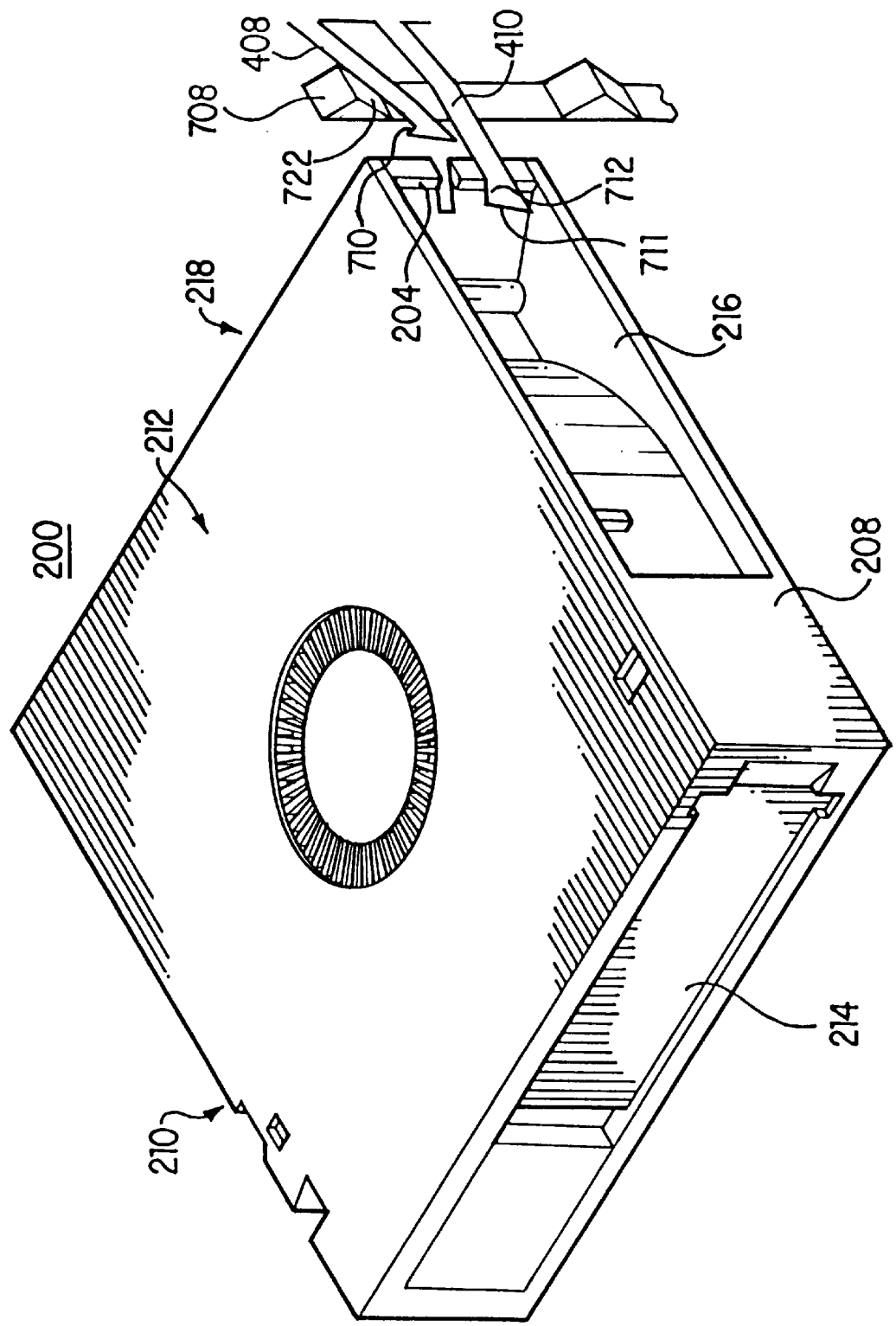
FIG. 2D shows the second perspective view of a typical DLT data cartridge of FIG. 2C with the lock spring disengaged according to the present invention.

FIG. 2A illustrates a bottom side perspective view of a typical DLT data cartridge 200. FIG. 2B illustrates a second bottom side perspective view of a typical DLT data cartridge 200. FIG. 3 illustrates a perspective view of a DLT data cartridge handling and storage caddy 300 from the cartridge magazine side 342 of the caddy and a top side perspective view of a DLT data cartridge 200. FIG. 3 also shows a dotted line illustrating the insertion path for inserting the data cartridge 200 into a middle storage slot 340 of the caddy 300.

The data cartridge slots 340 on the cartridge magazine side 342 of caddy 300 are defined by shelves 316 that extend between side walls 346 and 348 of caddy 300 or by partial shelves 318 and 320 that run along the X axis on both side walls 346 and 348 at substantially the same Z axis position. The use of either full shelves 316 or partial shelves 318 and 320 is a matter of design choice, although at least one full shelf 316 is preferred for the structural integrity of the caddy 300. The spacing between the shelves 316, 318, 320 in the Z axis direction is just slightly greater than the width W of the data cartridge 200.

Optionally, the outer edge 351 of shelves 316, 318, 320 may be ramped, going from a relatively thin outer edge of the shelves 316, 318, 320 to a slightly thicker shelf further along the X axis into the cartridge magazine side 342 of the caddy 300 for ease of orienting and inserting the data cartridge 200 into slots 340 by the user and the autochanger. Another option is to ramp the outer edge of caddy sidewalls 346 and 348 from a relatively thin outer edge to a slightly thicker wall further into the cartridge magazine side 342 of caddy 300 in the X axis direction for ease of orienting and inserting data cartridge 200 into slots 340 by the user and the autochanger. The ultimate distance between sidewalls 346 and 348 in the Y axis direction is just slightly greater than the length L of the data cartridge 200.

Caddy 300 includes a rear cartridge magazine side 342 into which the data cartridges 200 can be inserted and extracted from. Caddy 300 also includes a front user handling side 344 which has a handle 314 for a user to carry the caddy 300 with when the caddy 300 is removed from the storage rack 108. The handle 314 may also be utilized by the user to insert and extract the caddy 300 into and out of the storage rack 108.

As can be seen from FIGS. 2 and 3, a typical DLT data cartridge 200 is generally symmetrical or square in shape with relatively few surface features on the outer cartridge shell, such as notches, grooves of the like. Accordingly, it would be rather easy to insert a DLT data cartridge 200 into an autochanger storage rack (104 in FIG. 1) in an incorrect orientation, i.e., backwards, upside down, or in some other incorrect orientation. If a DLT data cartridge 200 is placed in an autochanger storage rack 108 in an incorrect orientation, the storage rack would not be able to read or write to the data cartridge 200, as the autochanger assumes that all of the data cartridges 200 are placed in the storage rack 108 in the same orientation.

In order to prevent a data cartridge 200 from being inserted into the handling and storage caddy 300, and thus, into the storage rack 108 in an incorrect orientation, caddy 300 of the present invention is equipped with data cartridge insertion guide tabs 322 along the inside of caddy wall 346 within each of the data cartridge slots 340 of caddy 300. Guide tabs 322 should be on sidewall 346 midway into the cartridge magazine side of the caddy within the data cartridge slots 340 such that guide tab 322 line-up with notch 202 in data cartridge 200 and when the data cartridge 200 is fully inserted into slot 340, the guide tab 322 will be contained within the recessed area 216 of the data cartridge 200.

It should also be noted that the ledge 204 side of notch 202 is shorter than the ledge 206 side of notch 202. Accordingly, the data cartridge will only line-up with guide tab 322 on the side of slot 340 in the magazine side 342 of the caddy 300 in the correct orientation for the picker 106. All but the correct data cartridge orientations are locked out from being installed into the caddy 300. After a data cartridge 200 has been oriented correctly with the desired slot 340 of the caddy 300 by the user, it can be installed into the caddy 300 by pressing it into the slot 340. Once the data cartridge 200 is inserted into slot 340, it is locked into place within slot 340 as will be described below in section II.

The data cartridge caddy 300 of the present invention was developed for an autochanger storage rack in which the picker 106 needs to pull the data cartridges 200 out of the storage rack 108 in an upright position. However, if a caddy is being designed for an autochanger storage rack in which the picker 106 pulls the data cartridges 200 out of the storage rack 108 from an upside down position, insertion guide tabs 322 could be appropriately positioned on sidewall 348 rather than sidewall 346 in order to accommodate the data cartridge 200 in an upside down fashion.

II. DATA CARTRIDGE INTERLOCK AND RELEASE SYSTEM

The data cartridge interlock and release system is best described with reference to FIGS. 2C, 2D, 3, 4, 7 and 8. The data cartridge interlock and release system locks data cartridges 200 into caddy 300 for safe transportation of the caddy 300 when it is outside the autochanger rack 104. The data cartridge interlock and release system also allows data cartridges 200 to be inserted into the caddy 300 without actuating the release mechanism. Thus, data cartridges 200 already in the caddy 300 are retained and can not be jarred out of the caddy 300 when an additional cartridge 200 is installed into the caddy 300. The data cartridge interlock and release system continues to provide a light holding force against the data cartridges 200 installed in it, when the release system is actuated in order to secure the data cartridges 200 in the caddy 300 when the autochanger experiences normal operational vibration and shock.

Figure 7:
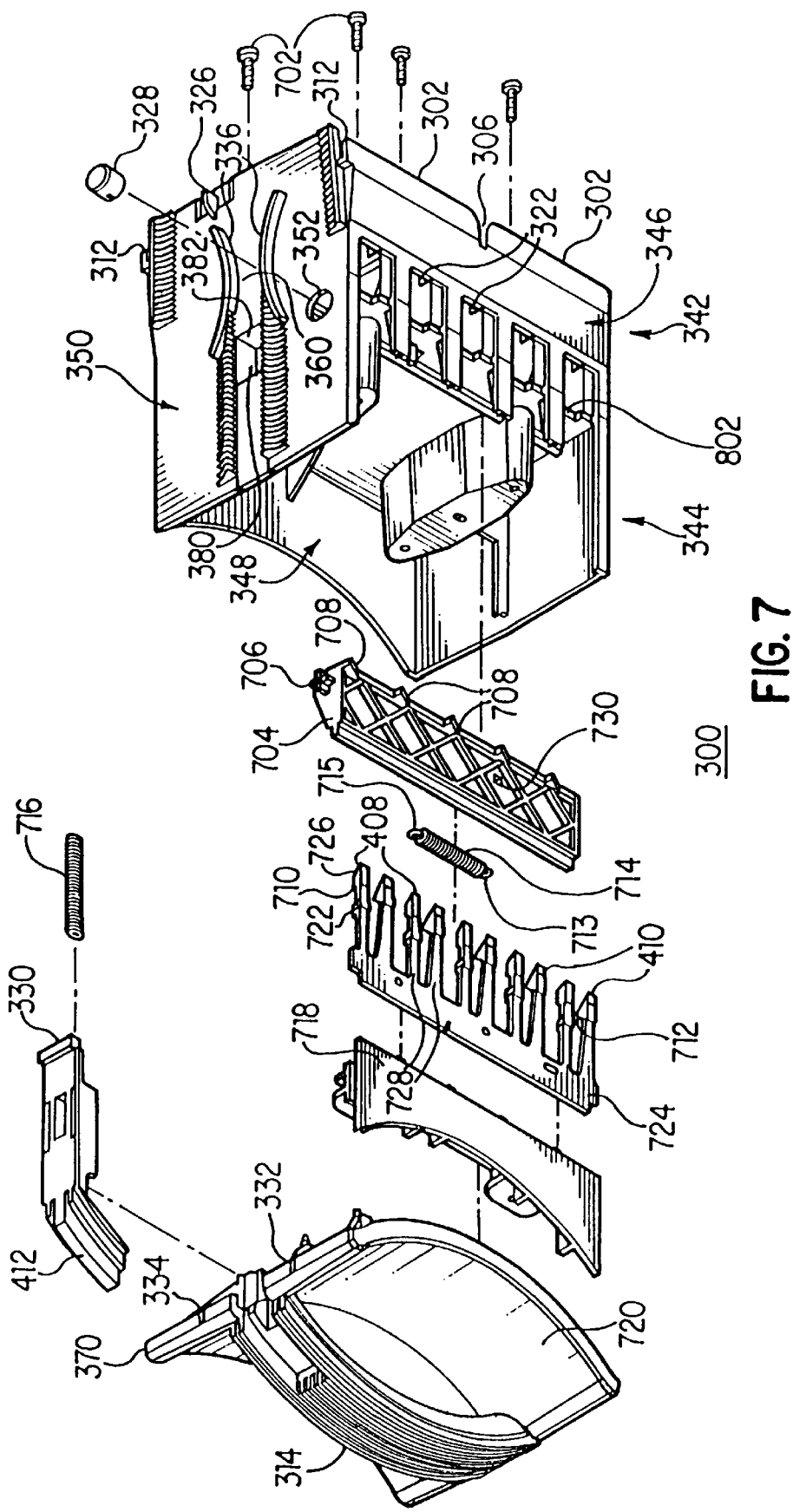
FIG. 7 shows a perspective view of a disassembled data cartridge caddy illustrating a data cartridge interlock and release system according to the present invention.
Figure 8:
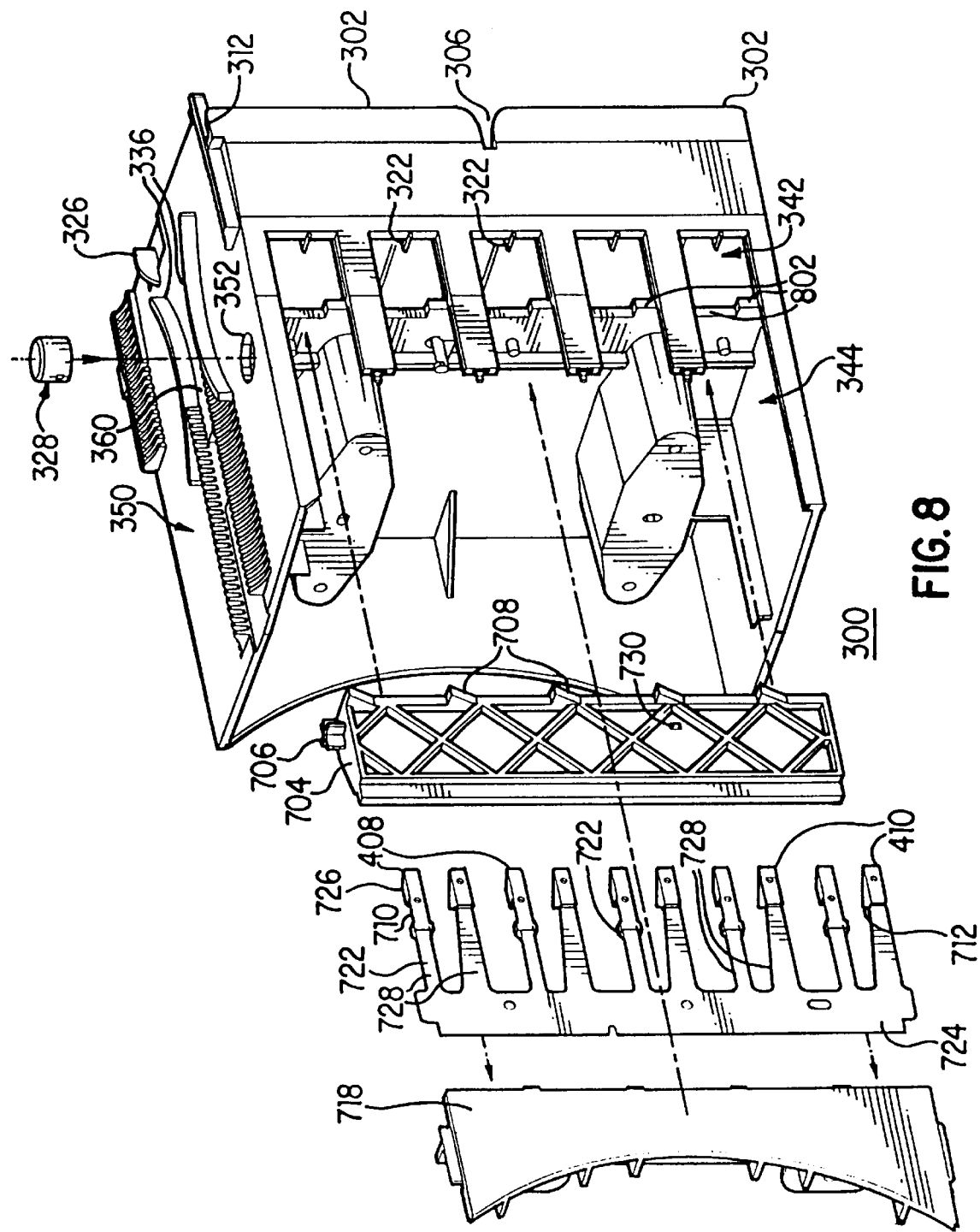
FIG. 8 shows a perspective view of a disassembled data cartridge caddy similar to FIG. 7.

The main functional components of the data cartridge interlock and release system are cartridge spring 724 and a lock release actuator 704, see FIGS. 7 and 8. Cartridge spring 724 comprises two different leaf springs 408 and 410 with two different tip profiles 710 and 712, respectively. The two types of leaf spring type latches 408 and 410 operate as a pair on a single cartridge 200, see FIGS. 2C and 2D.

The first latch 408 is a lock spring and has a tip profile 710 that catches ledge 204 on side 208 of data cartridge 200 when data cartridge 200 is fully inserted into slot 340 of caddy 300. Tip profile 710 of lock spring 408 will not release the data cartridge 200 unless the lock spring 408 is deflected out of the way. The lock tip geometry profile 710 and slanted tip 726 combination of lock spring 408 permits a data cartridge 200 to be inserted into the magazine without the other lock springs 408 or detent springs 410 being deflected out of the way. Lock spring 408 is used to secure the data cartridge 200 within the caddy 300. Lock spring 408 retains the data cartridge 200 securely inside the caddy 300 while the caddy 300 is being handled by the user outside of the autochanger rack 104. Lock spring 408 also secures the data cartridges 200 inside the caddy 300 should the caddy 300, through rough treatment, be slammed into the rack 104 during installation.

A second latch 410 is a pure detent spring that catches ledge 206 on side 208 of data cartridge 200, when data cartridge 200 is fully inserted into slot 340 of caddy 300, see FIGS. 2C, 2D, 7 and 8. Detent spring 410 provides light holding force and secures data cartridge 200 against a rear wall 802 of the magazine side 342 of caddy 300. Detent spring 410 is always operational. That is the detent spring is not disabled when the lock spring 408 is disabled. Therefore, the detent spring 410 is used to retain each data cartridge 200 in the caddy 300 while the lock spring 408 is disabled. The detent spring 410 can be overcome and will release data cartridge 200 when the data cartridge 200 is pulled by the picker 106 or the user while the lock spring 408 is disabled. Detent spring 410 keeps other data cartridges securely within caddy 300 whenever the lock spring 408 is disabled and the user or autochanger picker 106 removes one of the data cartridges 300. Detent spring 410 also retains the data cartridges in the caddy 300. Detent spring 410 also retains the data cartridges in the caddy 300 while the storage rack experiences normal operational vibration and shock and the lock spring 408 is disabled.

Spring 724 is preferably a one-piece, stainless steel spring with latches 408 and 410 created by means of plastic over-molded at the ends of the leaf spring fingers 728. Spring 724 could, however, be made of another spring hard material, such as spring hard steel, beryllium-copper, spring hard plastic, etc.

A lock spring release member 704 interfaces with and is used to deflect or disable the lock springs 408 and does not interface with or deflect the detent springs 410, see FIGS. 2C, 2D, 7 and 8. Specifically, lock spring release member 704 is held in place vertically within the magazine area 342 of caddy 300 by means of extending X-shaped tab 706 through hole 352 in caddy top 350 and securing lock spring release member 704 in place by means of one end 713 of extension spring 714 attached to spring attachment means 730 on the lock spring release member 704 and the opposite end 715 of spring member 714 attached to a similar spring attachment means (not shown) on the underside of caddy top 350. After lock spring release member 704 is secured within the magazine side 342 of caddy 300, cartridge spring 724 is snapped into spring retainer 718 and positioned in caddy 300 in such a manner that spring retainer 718 finishes side wall 346 on the handle side 344 of caddy 300 and leaf springs 408 and 410 extend through rear wall 802 into the magazine side 342 of caddy 300, see FIGS. 4, 7 and 8. Screws 702 secure hand front panel 720 to the rear wall 802 of caddy 300.

When fully assembled, leaf springs 408 and 410 extend from the handle side 344 into the cartridge magazine side 342 of caddy 300, see FIGS. 3, 4, 7 and 8. Thus, when a data cartridge 200 is properly aligned with a slot 340 and pushed into position, notch 202 of data cartridge 200 is aligned with guide tab 322 and ledges 204 and 206 slide along and displace ramps 710 and 711 of lock spring 408 and detent spring 410, respectively, until ledges 204 and 206 of data cartridge 200 are positioned behind lock tip 710 of lock spring 408 and ramp tip 712 of detent spring 410, respectively, see FIGS. 2C, 3 and 4. A cosmetic button 328 is snapped to X-shaped tab 706 of lock spring release member 704, see FIGS. 3, 4, 7 and 8.

When the data cartridge interlock and release system and the handle front panel 720 are fully assembled, the extension spring 713 holds the lock spring release member 704 against the under side of caddy top 350 in such a manner that displacement ramps 708 of lock spring release member 704 do not engage lock spring ramps 722 of lock spring 408 and do not displace lock springs 408 from the locked position, see FIGS. 2C, 2D, 4, 7 and 8. However, when button 328 is depressed, either manually or by a mechanical means within the autochanger, the lock spring release member 704 is moved downward and displacement ramps 708 of the lock spring release member 704 engage and displace lock spring ramps 722 of lock springs 408, see FIGS. 2C, 2D, 7 and 8. When lock spring 408 is displaced, lock tip 710 is disengaged from ledge 204 and only detent spring 410 holds data cartridge 200 in place within slot 340 by means of ledge 206. The spring force of detent spring 410 is enough to hold the weight of data cartridge 200 against vibration and shock, but can be easily overcome by the user or the picker 106 pulling on the data cartridge 200.

Lock spring release member 704 and spring retainer 718 are preferably made of molded plastic, such as polycarbonate or nylon. Lock spring release member 704 and spring retainer 718 could also be made of polycarbonate or nylon. Compression spring 716 and extension spring 714 are preferably made of spring hard steel. Cosmetic button 328, caddy spring lock release 412 and handle front panel 720 are preferably made of cosmetically colored molded plastic, but could also be made of steel, brass, aluminum, etc.

III. DATA CARTRIDGE INTERLOCK RELEASE ACTUATOR SYSTEM

The data cartridge interlock release actuator system is best described with reference to FIGS. 2C, 2D, 3, 4–10. The data cartridge interlock release actuator system allows the data cartridges 200 to be locked into the data cartridge caddy 300 until needed by the autochanger, such that normal vibration and shock from the operation of the autochanger or the high force levels associated with the user inserting and removing the caddy 300 into the storage rack do not dislodge the data cartridges 200 from the caddy 300. The data cartridge interlock release actuator system also allows the autochanger to unlock the lock spring 408 by actuating the data cartridge interlock release actuator system, which depresses the button 328 that activates the lock spring release member 704 and displaces the lock spring 408. The autochanger can accomplish the actuating of the data cartridge interlock release actuator system by means of the picker 106, other robotic means, or other mechanical mechanism. In the preferred embodiment, the picker 106 actuates the data cartridge interlock release actuator system. However, a motor or solenoid could also actuate the cartridge interlock release system.

Figure 4:
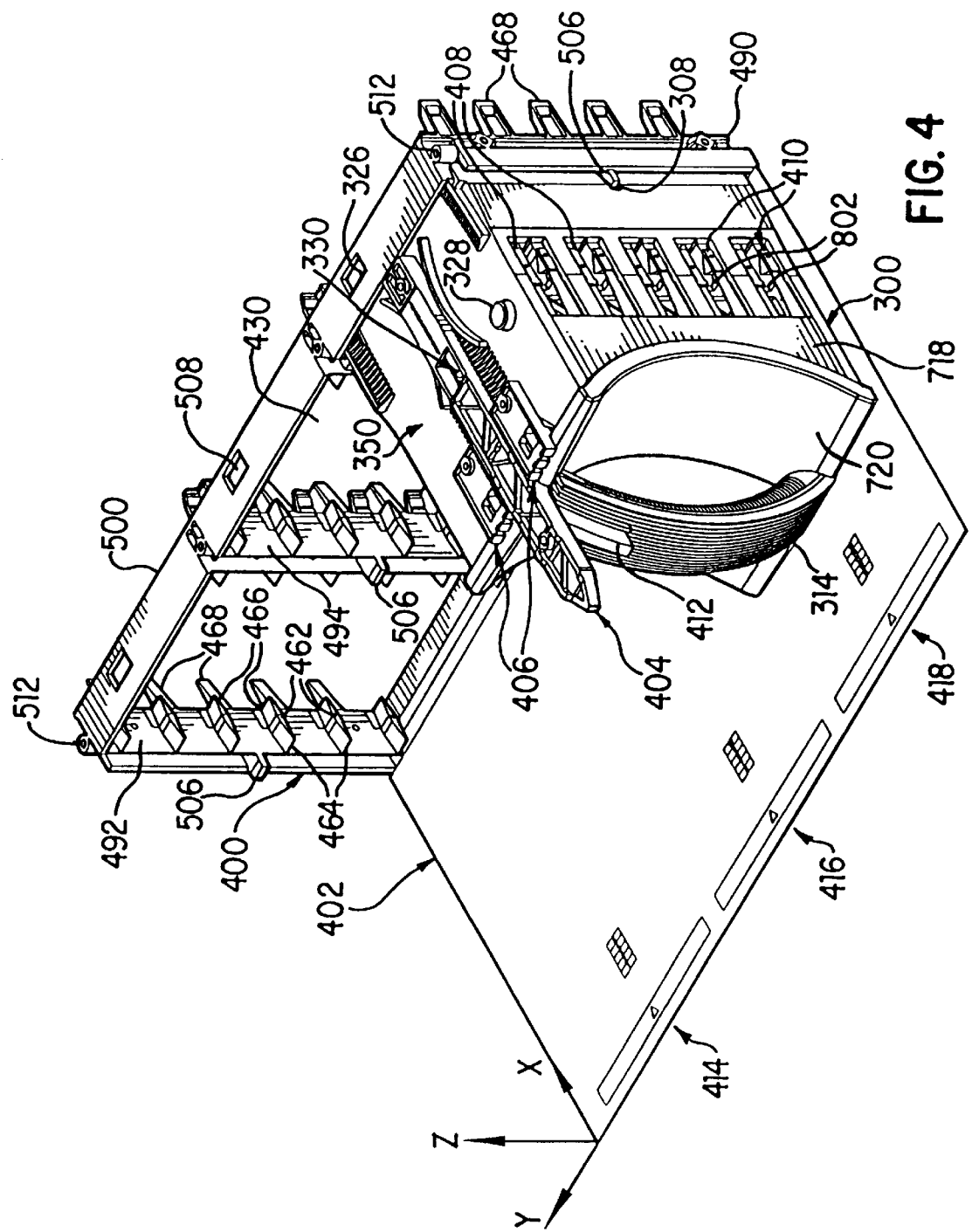
FIG. 4 shows a perspective view of a data cartridge caddy-to-storage rack referencing system and cartridge caddy according to the present invention.
Figure 5:
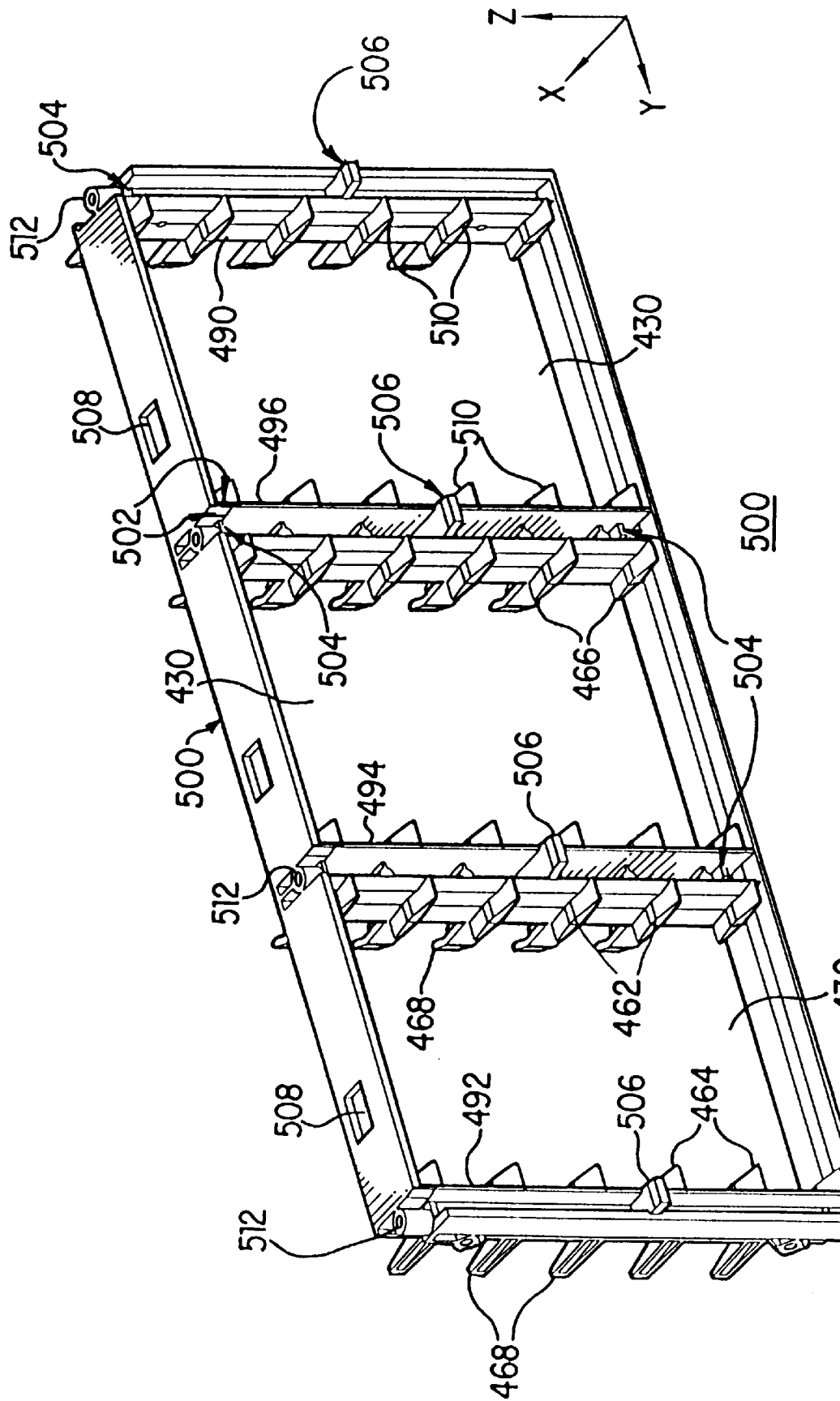
FIG. 5 shows a perspective view of a data cartridge caddy-to-storage rack referencing sleeve according to the present invention.
Figure 6:
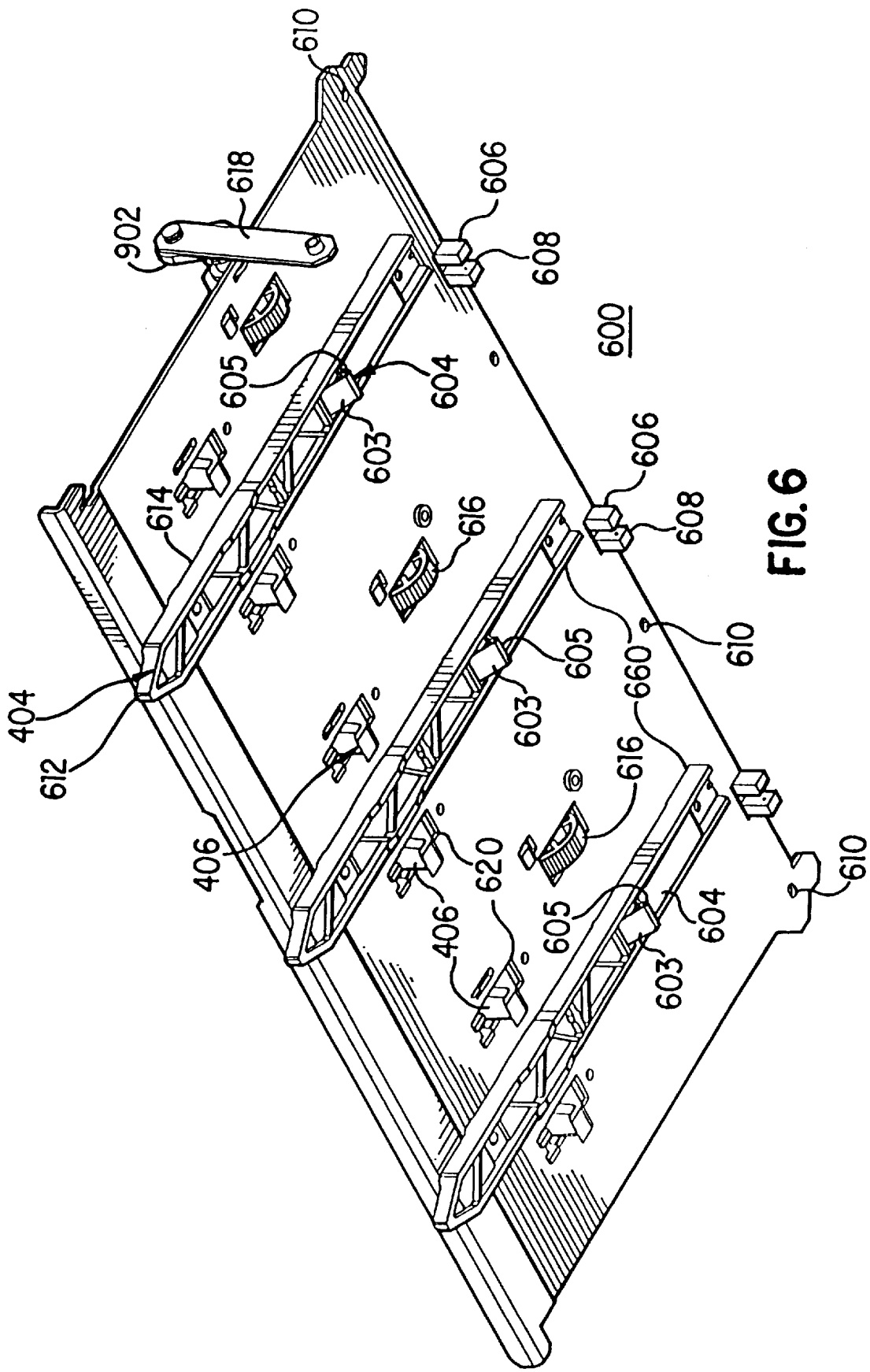
FIG. 6 shows a perspective view of a data cartridge caddy-to-storage rack referencing system top plate according to the present invention.

The previous section II on the data cartridge interlock and release system described how displacement ramp 708 of lock spring release member 704 displaces lock spring ramp 722 and disengaged lock spring 408 when the button 328 is pressed downward and activated. FIGS. 4 and 5 show a caddy guide referencing sleeve 500 and a caddy guide bottom plate 402. FIG. 6 shows a caddy guide top plate 600. The caddy guide referencing sleeve 500, caddy guide bottom plate 402 and caddy guide top plate 600 help form the exterior of the autochanger storage rack 108 into which the caddy 300 is locked so that the picker of the autochanger can access the data cartridges 200. Caddy guide top plate 600 is attached to caddy guide referencing sleeve 500 by means of screws, rivets, or the like via holes 610 in the caddy guide top plate 600 and holes 512 in the caddy guide referencing sleeve 500.

When the caddy 300 is properly positioned in the autochanger storage rack 108, button 328 is aligned with lock release lobe 616 on the under side of caddy guide top plate 600, see FIGS. 4–6. Lock release lobe 616 is attached to cam shaft 908, which is attached to cam torque arm 902, which is attached to actuation link 618, which is attached to actuation lever 904 having lever pivot bushing 906. The cam shaft 908 is rotatingly mounted to the top side of the caddy guide top plate 600, such that the lock release lobes 616 extends through holes in the caddy guide top plate 600 and line-up with the button 328 on the top 350 of the caddy 300.

The pivot bushing 906 is rotatingly attached to the autochanger storage rack such that when actuation lever 904 is raised and lowered, as shown by arrow 1004, the pivot bushing 906 is the lever rotation axis 1002. The actuation lever 904 is raised and lowered by the picker 106 or by some other robotic or mechanical means within the autochanger unit, such as a motor or solenoid. In its free state, the actuation lever 904 is in a downward position, as shown in FIGS. 9 and 10, and the cam shaft 908 is oriented with the lock release lobes 616 providing no deflection of button 328.

When the actuation lever 904 is lifted, the cam shaft 908 rotates and the lock release lobes 616 rotate such that the wider portion 910 engages and depresses the button 328 to actuate lock spring release member 704 and release lock springs 408 so that a cartridge 200 may be removed from the caddy 300 by the picker 106. The cam shaft 908 rotates far enough to go over, where it will stay in a detent position during normal operation until the picker 106 lowers the actuation lever 904. When the actuation lever 904 is lowered, the cam shaft 908 rotation reverses, the cam shaft 908 goes back over center and is returned and held in the free state by an extension spring (not shown) fixed to the actuation lever 904.

In the preferred embodiment, cam shaft 908, actuation link 618 and actuation lever 904 are made of stainless steel, but may also be made of plastic, steel, aluminum or some other similarly hard material. Also in the preferred embodiment, lock release lobe 616, cam torque arm 902 and pivot bushing 906 are made of molded plastic, but may also be made of brass, steel or similar material.

Cam shaft 908 may be made as a cylindrical shaft as shown in FIG. 9 with pins to lock lobes 616 to cam shaft 908 in order to prevent slipping of lobes 616 when torque is applied. Or preferably, cam shaft 908 is a square shaft, which prevents lobes 616 from slipping when torque is applied and eliminates the need for pins to hold lobes 616 to cam shaft 908.

IV. DATA CARTRIDGE CADDY-TO-STORAGE RACK REFERENCING SYSTEM

The data cartridge caddy 300 permits a user of a DLT autochanger storage rack to manually install or remove up to five data cartridges 200 at a time from the autochanger storage rack. Also, while inside the storage rack, the data cartridge caddy 300 provides storage for the data cartridges 200 when not in use by the autochanger. The caddy 300 must also accurately reference the cartridges 200 to the cartridge handling system or picker 106. Therefore, an accurate alignment and referencing scheme is necessary to guide the caddy 300 from its free state outside of the storage rack 108 to its final referenced position inside the storage rack 108 when it is being installed manually by a user.

The data cartridge caddy-to storage rack referencing system will be described with reference to FIGS. 3–8. The parts involved in aligning and referencing the caddy 300 to the autochanger storage rack 108 include the caddy guide bottom plate 402, the caddy guide referencing sleeve 500, caddy guide rail 404, caddy hooks 406, caddy lock spring 604, and caddy guide top plate 600.

In the preferred embodiment, the caddy guide top plate 600 is a removable steel sheet metal base that is attached to the storage rack 108, see FIG. 6. The attaching of the caddy guide top plate 600 to the autochanger storage rack 108 provides referencing in the Z direction. The caddy guide top plate 600 may also be made of any suitable engineering material such as aluminum, steel, or molded plastic which incorporates parts 404, 406 and the shaft mount (not shown) that secures cam shaft 908 to top plate 600. Caddy guide rail 404 is made of molded plastic and is attached to the underside of the caddy guide top plate 600, see FIGS. 4 and 6. Caddy guide rail 404 may also be made of carbon and Teflon-filled nylon or any material that wears well against friction. Caddy hooks 406 are made of molded plastic and are mounted on the topside of caddy guide top plate 600 and extend through holes 620 to the underside of caddy guide top plate 600, see FIGS. 4 and 6. Caddy hooks 406 could also be made of carbon and Teflon-filled nylon or any material that wears well against friction.

Caddy lock spring 604 is made of stainless steel and is mounted to the caddy guide rail 404 on the underside of the caddy guide top plate 600. Caddy lock spring could also be made of a heat treated carbon steel or other spring hard material. The caddy guide referencing sleeve 500 is made of molded plastic and is attached to the caddy guide top plate 600 by means of screws, rivets or the like through holes 610 in the caddy guide top plate 600 and holes 512 in the caddy guide referencing sleeve 500 after the caddy guide top plate 600 is installed in the autochanger storage rack 108, see FIGS. 4 and 6. Referencing in the X and Y directions is provided when the caddy guide referencing sleeve 500 is attached to the structure of the caddy guide top plate 600 and the autochanger storage rack 108. The caddy guide referencing sleeve 500 could also be made of carbon and Teflon-filled polycarbonate or other strong material that is also capable of dissipating the static electricity that builds up when two surfaces slides against each other. The caddy guide bottom plate 402 is made of polycarbonate and is attached to the caddy guide referencing sleeve 500 and provides initial caddy-to-storage rack referencing as the user aligns the caddy 300 with the storage rack 108 and begins the installation procedure, see FIG. 4. The caddy guide bottom plate 402 may also be made of steel or nylon.

A. Caddy Installation Initial Referencing

Since the autochanger storage rack 108 can hold up to three caddies 300, the user has three choices for a slot 430 in the caddy guide referencing sleeve 500 to install a caddy 300 into. A caddy guide bottom plate 402 is provided in order to assist the user in aligning the caddy for installation into a chosen slot 430 in the caddy guide referencing sleeve 500. The caddy guide bottom plate 402 has positioning guide labels 414, 416, and 418 on it indicating the locations of the three slots 430. The caddy guide bottom plate 402 serves as the cosmetic surface that the caddy 300 initially slides upon inside the storage rack 108 prior to final referencing and lock-in. The caddy guide bottom provides Z direction guidance as the user aligns the caddy 300 in the Y direction prior to sliding the caddy 300 in the X direction in order to install the caddy 300 into the storage rack 108.

B. Caddy Installation Intermediate Referencing

As the user starts to slide the caddy 300 on the caddy guide bottom plate 402 into the chosen slot 430, the caddy guide rail 404 maintains preliminary and intermediate Y direction referencing within channel 360 on the top 350 surface of the caddy 300. Initial lead-in on the caddy channel 360 and the caddy guide rail 404 interact to smoothly guide the caddy 300 to more accurate positioning in the Y direction. Specifically, the caddy guide rail 404 is tapered at the initial end 612 and the caddy channel 360 is flared outward to allow for easier lead-in. The purpose of the caddy guide rail 404 in this regard is to restrain the caddy 300 in the Y direction while the user slides the caddy 300 in the X direction to its final referenced and locked-in position.

The cartridge guide tabs 462 on the caddy guide referencing sleeve 500 also provide Z direction referencing with the data cartridges 200 in the caddy 300. Cartridge guide tabs 462 are tapered at the front side 464 to provide a smooth transition to additional Z direction referencing beyond the initial Z direction referencing provided by the caddy guide bottom plate 402.

C. Caddy Installation Final Z Referencing

As the user continues to push the caddy 300 into the storage rack 108, Z referencing tabs 506 on the caddy guide referencing sleeve 500 engage Z referencing slots 306 and 308 at the front, magazine side 342 of the caddy 300, see FIGS. 3–5. Also, caddy hooks 406 engage ledge 370 of handle front panel 720, see FIGS. 3,4 and 6. The Z referencing tabs 506 and the caddy hooks 406 simultaneously lift the caddy 300 up off of the caddy guide bottom plate 402 to provide final referencing of the caddy 300 in the Z direction. Tapered lead-in on the Z referencing slots 306 and 308 on the caddy 300, the Z referencing tabs 506 on the caddy guide referencing sleeve 500, the ledge 370 of handle front panel 720, and caddy hooks 406 allow for a smooth transition to the final referenced position in the Z direction, see FIGS. 3–6.

D. Caddy Installation Final Y Referencing

At the same time as the caddy 300 is being referenced in the Z direction by the caddy guide referencing sleeve 500 and the caddy hooks 406, Y referencing slots 312 in the top 350 on the front, magazine side 342 of the caddy 300 engages with Y referencing fins 502 of the caddy guide referencing sleeve 500 to establish final referencing of the caddy 300 in the Y direction, see FIGS. 3–5. Tapered lead-in on the Y referencing fins 502 and flared lead-in 15 on the Y referencing slots 312 allow for a smooth transition to the final referenced position in the Y direction, see FIGS. 3–5.

Final Y referencing is also provided by a vertical tab (not shown) within caddy hooks 406 engaging slots 332 and 334 of handle front panel 720, see FIGS. 3, 4, 6 and 7. Slots 332 and 334 have a flared lead-in, in order to allow for a smooth transition to final Y direction referencing to caddy hooks 406.

This final Y direction referencing replaces the preliminary Y direction referencing provided by the caddy guide rail 404. To ensure that the caddy does not bind between the Y referencing provided by the caddy guide rail 404 and the Y referencing provided by the Y referencing fins 502 of the caddy guide referencing sleeve 500, the caddy guide rail 404 may be narrower in the backside 660 to coincide with a position where the Y referencing fins 502 of the caddy guide referencing sleeve 500 take over with the Y direction referencing.

E. Caddy Installation Final X Referencing

The last referencing of the caddy 300 during installation in the storage rack 108 is established in the X direction. The user pushes the caddy 300 in the X direction until the caddy 300 stops due to X referencing surfaces 302 and 304 on the front, magazine side 342 of side walls 346 and 348, respectively come into contact with X referencing pads 504 of the caddy guide referencing sleeve 500, see FIGS. 3–5. The caddy lock spring 604 on the caddy guide top plate 600 locks into hole 380 in the top 350 of the caddy 300 and locks the caddy 300 into place when the caddy 300 is completely installed into the storage rack 108. The caddy 300 is now locked into its final referenced position within the storage rack 108 and the picker 106 of the autochanger is referenced to and is able to interface with the cartridges 200 within the cartridge caddy 300.

V. DATA CARTRIDGE CADDY-TO-STORAGE RACK INTERLOCK AND RELEASE SYSTEM

The data cartridge caddy-to-storage rack interlock and release system will be described with reference to FIGS. 3, 4, 6, 7 and 11. As mentioned above in Section VI., when caddy 300 is fully installed into the storage rack 108, caddy lock spring 604 on the caddy guide top plate 600 locks into hole 380 in top 350 of caddy 300 and locks caddy 300 into place within the storage rack 108 against backward movement in the X direction. When the caddy lock spring 604 is locked into hole 380, lock ledge 605 of lock spring 604 engages surface 382 of hole 380 and holds the caddy in place. When the user desires to remove caddy 300 from the storage rack 108, the user may depress the caddy spring lock release 412 toward the handle 314. When the caddy spring lock release 412 is actuated, ledge 330 slides along ramp surface 603 of lock spring 604 and displaces the lock spring 604 from the locked position, so that caddy 300 is free to be removed from the storage rack 108.

The caddy lock spring 604 must be weak in the Z direction in order to allow thumb actuation of the caddy spring lock release 412 to be as light as possible. However, the caddy lock spring 604 must be able to withstand operation vibration and forces and hold the caddy against forces in the X direction and slight Z direction forces. Accordingly, in a preferred embodiment, the locking ledge 605 of lock spring 604 is overbent towards surface 382, rather than being substantially vertical, see FIG. 11.

VI. DATA CARTRIDGE-TO-CADDY REFERENCING SYSTEM FOR THE DATA CARTRIDGE HANDLING MECHANISM WITHIN THE AUTOCHANGER

The caddy guide referencing sleeve 500 not only provides referencing for the caddy 300 to be installed into the storage rack 108, but also provides lead-in referencing for the data cartridges 200 being inserted into the caddy 300 by the data cartridge handling mechanism or picker 106, see FIGS. 4 and 5.

Specifically, data cartridge Z referencing tabs 462 provide Z direction referencing for the picker 106 from the back side of the caddy guide referencing sleeve 500. Data cartridge referencing tabs 462 are tapered at the backside ends 466 to provide a smooth transition to Z direction referencing to the picker 106. Also, data cartridge Y referencing tabs 468 provide Y direction referencing for the picker 106 from the backside of the caddy guide referencing sleeve 500. Data cartridge Y referencing tabs 468 are also tapered to provide a smooth transition to Y direction referencing to the picker 106. The picker will continue to slide the data cartridge 200 in the X direction until the data cartridge 200 hits wall 802 within caddy 300, at which point the data cartridge is locked into caddy 300 by lock spring 408 and detent spring 410.

VII. DATA CARTRIDGE CADDY PRESENCE SENSING METHOD AND APPARATUS

When autochangers of the prior art were initially turned on, the data cartridge handling mechanism or picker 106 would automatically go around and bump into all of the possible data cartridge positions to determine which data cartridge positions had a data cartridge 200 in it. As autochangers acquire the capability to handle more data cartridge positions, this method becomes time consuming and inefficient.

The data cartridge caddy presence sensing method and apparatus according to the present invention will be described with reference to FIGS. 3–8. The present invention provides a method and apparatus for the autochanger to automatically, electronically sense the presence of data cartridge caddy 300 within the storage rack. Once the autochanger recognizes which data cartridge caddies 300 are present within the storage rack 108, the picker will not attempt to remove data cartridges 200 from data cartridge positions of data cartridge caddies 300 that are not present.

The basic elements of the data cartridge caddy presence sensing method and apparatus include a optical interrupt flag 326 on the top 350 of the caddy 300 and optical interrupt sensors 606 and 608 provided on the underside of the caddy guide top plate 600, see FIGS. 3, and 6–8. When the caddy guide referencing sleeve 500 is attached to the caddy guide top plate 600, the optical interrupt sensors 606 and 608 extend through holes 508 in caddy guide referencing sleeve 500, see FIGS. 4–6.

When a caddy 300 is fully installed in the storage rack 108, the optical interrupt flag 326 will trip the optical interrupt sensors 606 and 608. This information will be sent to the controller of the picker 106 via electronic signal. Once the picker determines which data cartridge caddies 300 are present and which are not present, the picker 106 will go around and bump into the possible data cartridge positions of caddies 300 that are present and will skip the data cartridge positions of missing caddies 300.

An alternative to this embodiment of the present invention is to use reflective sensors, magnetic sensors, or micro switches. Also, instead of the picker 106 going around and bumping into the data cartridge positions of caddies 300 that are present to determine whether the data cartridges 200 are present within the caddies 300 that are present, there could also be data cartridge presence sensors on Y direction referencing tabs 466 at each data cartridge position or on caddy guide referencing sleeve posts 490, 492, 494, 496 within each data cartridge position. In this alternative embodiment, once the controller of the picker 106 knew which caddies 300 were present, it would then query which data cartridges 200 were present within the caddies 300 that were present by sensing which optical sensors had been interrupted by the presence of the data cartridges within the caddy guide referencing sleeve 500.

Another alternative embodiment is to utilize a bar-code reader to read bar-code labels on the cartridges of the known present caddies to determine which data cartridges are present. If the bar-code reader does not find a bar-code label of a cartridge slot within a known present caddy, then the picker could determine whether that particular cartridge was present utilizing the "sense of touch" or bumping method. Any of the above methods is much faster and more efficient than the typical "sense of touch" method of determining which caddies are present within the autochanger and which data cartridges are present within the caddies.

The foregoing description of the present invention has been presented for purposes of illustration and description. It is not intended to be exhaustive or to limit the invention to the precise form disclosed, and other modifications and variations may be possible in light of the above teachings. For example, a caddy 300 that holds a number of cartridges 200 other than five is within the scope of the present invention. Also, a storage rack that holds a different number of caddies 300 other than three is possible. Moreover, the data cartridges 200 are held in the caddy 300 in the direction described is to accommodate an HP autochanger C5150, other autochangers handle cartridges 200 from different initial orientations, such as upside down or sideways, which are within the scope of the present invention. Still further, the present invention was described for use of DLT data cartridges in an autochanger library. However, the concepts of the present invention would also be applicable to magneto-optical storage devices, CDS in a CD player, any type of tape cartridge, etc.

The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A data cartridge caddy-to-storage rack referencing system that permits a user to install a data cartridge into a storage rack and provides accurate alignment of data cartridges within that data cartridge caddy to an autochanger once the data cartridge caddy is installed in the storage rack of the autochanger, said data cartridge caddy-to-storage rack referencing system comprising:

a caddy guide bottom plate for providing preliminary Z direction referencing between said data cartridge caddy and said storage rack prior to installing said caddy into said storage rack;

a caddy guide rail for providing preliminary and intermediate Y direction referencing between said data cartridge caddy and said storage rack prior to and during installation of said data cartridge caddy into said storage rack;

at least one cartridge guide tab for providing intermediate Z direction referencing between said data cartridge caddy and said storage rack during installation of said data cartridge caddy into said storage rack;

Z referencing tabs that correspond with Z referencing slots for providing final Z direction referencing between said data cartridge caddy and said storage rack and between said data cartridge caddy and said autochanger once said data cartridge caddy is installed in said storage rack;

at least one Y referencing fin that engages at least one Y referencing slot for providing final Y direction referencing between said data cartridge caddy and said storage rack and between said data cartridge caddy and said autochanger once said storage cartridge caddy is installed in said storage rack; and at least one X referencing pad that engages at least one X referencing surface for providing final X direction referencing between said data cartridge caddy and said storage rack and between said data cartridge caddy and said autochanger once said data cartridge caddy is installed in said storage rack.

2. The data cartridge caddy-to-storage rack referencing system according to claim 1, wherein said final Z direction referencing also includes at least one caddy hook the engages at one ledge, providing additional final Z direction referencing.

3. The data cartridge caddy-to-storage rack referencing system according to claim 2, wherein said final Y direction referencing also includes at least one vertical tab with said at least one caddy hook that engages a slot, providing additional final Y direction referencing.

4. The data cartridge caddy-to-storage rack referencing system according to claim 1, wherein said final X direction referencing also includes a caddy lock spring that engages a hole, providing additional final X direction referencing.

* * * * *